United States Patent [19]
Felder

[11] 3,910,126
[45] Oct. 7, 1975

[54] POWER TAKE-OFF FROM BICYCLE CRANK

[76] Inventor: Arnold Felder, 821 82nd St., Miami Beach, Fla. 33141

[22] Filed: June 20, 1974

[21] Appl. No.: 481,348

[52] U.S. Cl. .................. 74/11; 74/12; 180/53 A; 280/214; 280/289
[51] Int. Cl.² ........................................ F16H 37/00
[58] Field of Search ............ 74/11, 12, 15.63, 15.8; 280/289, 212, 213, 214, 260; 180/33 C, 53 A

[56] References Cited
UNITED STATES PATENTS

| | | | |
|---|---|---|---|
| 390,017 | 9/1888 | Hagan | 280/214 |
| 506,685 | 10/1893 | Fryer | 280/260 |
| 599,065 | 2/1898 | Pincus | 280/260 |
| 841,434 | 1/1907 | Pequegnat et al. | 180/33 C |
| 1,392,848 | 10/1921 | Olsen | 280/260 |
| 2,146,463 | 2/1939 | Bone | 74/12 |
| 2,579,154 | 12/1951 | Morrison, Jr. | 74/11 |

FOREIGN PATENTS OR APPLICATIONS

| | | | |
|---|---|---|---|
| 218,250 | 3/1942 | Switzerland | 280/212 |
| 793,659 | 1/1936 | France | 280/213 |

*Primary Examiner*—Benjamin W. Wyche
*Assistant Examiner*—Allan R. Burke
*Attorney, Agent, or Firm*—Erwin M. Barnett

[57] ABSTRACT

The journal box of the pedal crank of a bicycle removably mounts a power take-off shaft and pinion which engages a bevel gear mounted on the center section of the crank within the box to be driven by pedalling.

4 Claims, 3 Drawing Figures

U.S. Patent  Oct. 7,1975  3,910,126
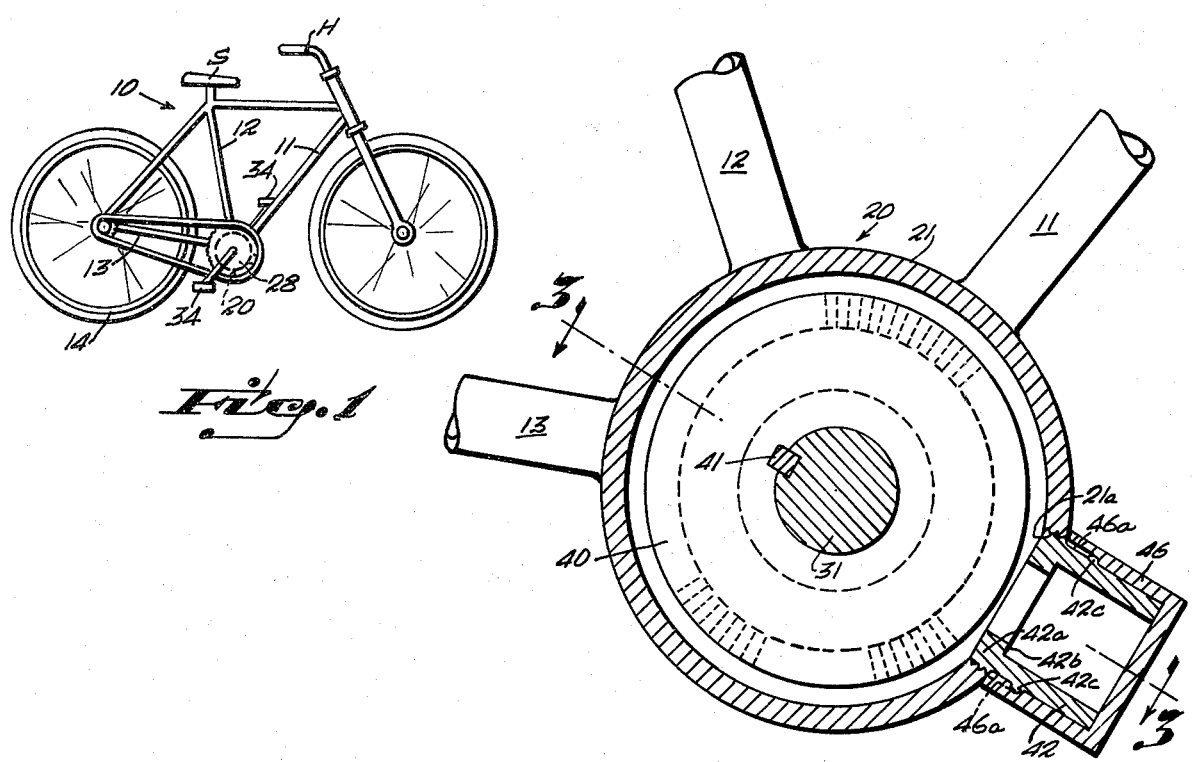
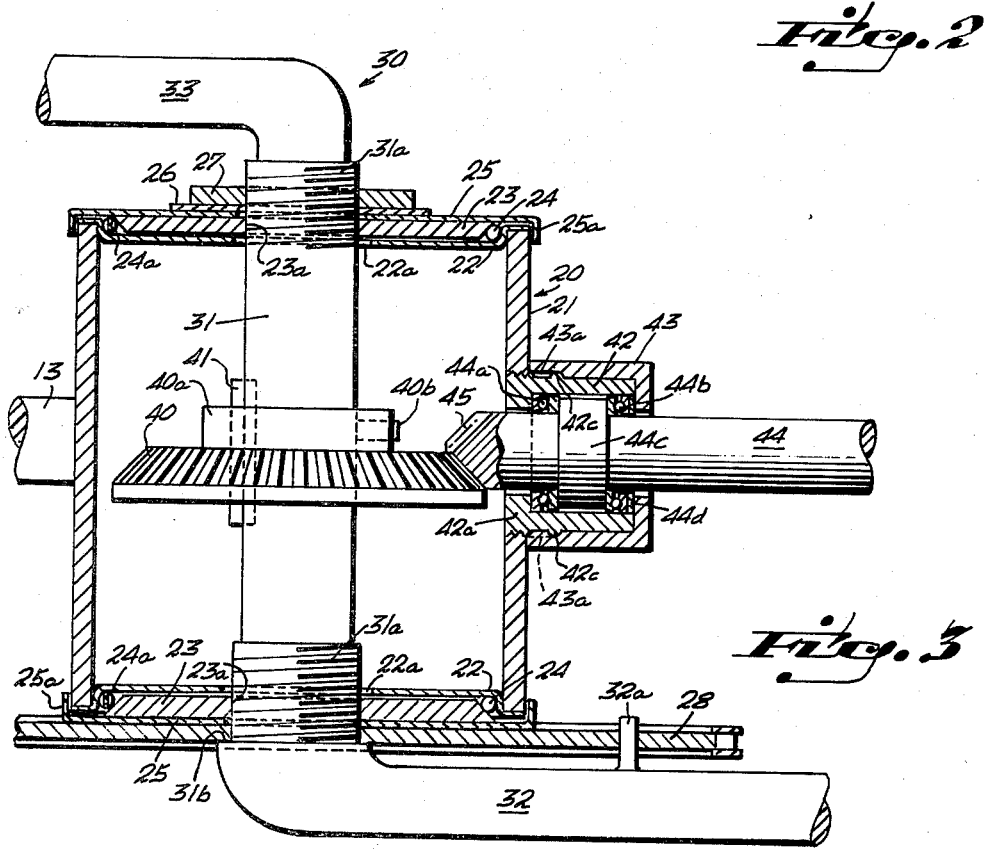

POWER TAKE-OFF FROM BICYCLE CRANK

FIELD OF THE INVENTION

The invention relates generally to bicycles or other vehicles having pedal cranks mounted for rotation in a journal box carried on the vehicle frame and a power take-off device associated therewith.

SUMMARY OF THE INVENTION

Among the objects of the invention is to utilize the high energy potential of human leg power by taking advantage of a household device, namely, the bicycle, having the requisite pedal actuated crank, supporting frame and seat arrangement for a most comfortable and efficient application of leg energy, and furthermore, to provide the bicycle journal box of the pedal crank with a power take-off device which shall comprise few and simple parts including a built-in component requiring minimum modification of standard journal boxes presently in use and a readily attachable component for removal when not in use.

The invention contemplates the permanent built-in component as a bevel gear mounted on the horizontal mid-section of the pedal crank between the bearings within the journal box and an opening in the latter located for access to the gear and having associated therewith the fixed element of a quick detachable mounting means for a power take-off drive shaft. A removable closure cap for the opening normally engages the fixed element when the power take-off is not in use. The attachable component, which may either be a separate intermediate interconnecting means between the crank and the equipment to be driven or be part of such equipment, comprises a bearing means formed with the other element of the quick detachable mounting means and a drive shaft rotatably mounted in the bearing means terminating in a pinion adapted to project through said journal box opening for meshing with the bevel gear.

BRIEF DESCRIPTION OF THE DRAWING

FIG. 1 is a side elevational view of a bicycle having a pedal crank journal box constructed to embody the invention with the attachable component of the power take-off removed and the opening closed by a cap.

FIG. 2 is an enlarged fragmentary vertical section through the journal box shown in FIG. 1, and FIG. 3 is a sectional view taken on line 3—3 in FIG. 2 showing the power take-off assembled for use.

DESCRIPTION OF PREFERRED EMBODIMENT

Referring in detail to the drawing, 10 denotes a bicycle of any conventional construction having a frame including a down tube 11, a seat supporting tube 12 and a rear fork 13, all radiating from journal box 20 in which crank 30 is rotatably mounted. The invention is applicable to the various crank constructions well known in the art including the two major types, namely, the three piece assembly and integrally formed crank 30 herein shown and described for illustrative purposes to comprise center horizontal section 31, right and left arms 32 and 33, respectively, which terminate at their opposite free ends in threaded openings (not shown) in which pedals 34 are mounted.

Journal box 20 is shown to comprise an open ended tubular casing 21 to which tubes 11 and 12, and rear fork 13 are welded or otherwise secured. The bearing assembly for crank 30 may be of any known or suitable construction, an example being shown herein to include a pair of outer races 22 which may be press fitted into each opposite open end of casing 21 and each having a central opening 22a through which crank section 31 freely extends. A pair of inner races 23 are secured to rotate with and support crank 30 for rotation on bearing balls 24 which are retained in spaced relation in cage 24a located between the bearing surfaces of inner and outer races 22 and 23. Each inner race 23 may have an internally threaded central opening 23a which adjustably engages one of the spaced threaded portions 31a on section 31. A dust cover 25 abuts each inner race 23 providing opposite end closures for journal box 20. Each dust cover 25 turns with crank 30 and has an inturned flange 25a extending over but clearing the free ends of casing 21.

Drive sprocket 28, which is usually located on the right side of journal box 20, may on its outer side abut a shoulder 31b formed on crank section 31 beyond the right threaded portion 31a and on its inner side abut the right dust cover 25 which may be held against the sprocket 28 by the right inner race 23 being tightened thereagainst on its crank threaded portion 31a. Boss 32a, extending from right radial arm 32, engages drive sprocket 28 to positively key the latter to turn with crank 30. The opposite or left threaded portion 31a beyond left dust cover 25 carries a lock nut 27 which when tightened against a keyed washer 26 secures the bearing assembly in journal box 20.

The permanent built-in component of the power take-off from crank 30 embodying the invention comprises bevel gear 40 suitably mounted on a midportion of crank section 31 to rotate therewith as by key 41 and may be longitudinally adjustable along section 31 by set screw 40b extending through hub 40a thereof. One or more locations for connecting the attachable component of the power take-off may be provided on the surface of casing 21 between any two of tubes 11 and 12 and fork 13, as for example, as herein shown in FIG. 2 on the forward facing surface of casing 21 below down tube 11 and is formed as an opening 21a tapped and threaded to receive therein threaded end 42a of sleeve 42. The latter serves as the fixed element of the quick detachable mounting means for the power take-off and may alternatively be secured to the casing 21 by welding or swaging. Sleeve 42 has an interior shoulder 42b and a pair of pins 42c which are the male element of a bayonet joint herein utilized as the quick detachable mounting means. Closure cap 46 is sized to fit sleeve 42 and, as the female element of said bayonet joint, has L-shaped grooves 46a formed in the interior surface and located to engage pins 42c.

The attachable component of the power take-off comprises drive shaft 44 terminating in a pinion 45 which is adapted to be inserted through sleeve 42 to mesh with bevel gear 40. Suitable bearing means, which rotatably supports drive shaft 44 in sleeve 42, is seen in FIG. 3 to comprise a pair of bearings 44a and 44b spaced apart by and coacting with shaft enlargement 44c, bearing 44a being press fitted or otherwise secured to shaft 44 against accidental dislodgement when the latter is detached from sleeve 42. Collar 43 is sized to fit over sleeve 42 and has L-shaped grooves 43a formed as the female element of the bayonet joint located to engage pins 42c. Spring washer 44d acts between collar 43 and bearing 44b urging shaft 44 inwardly and provides tolerance for smooth operation between bevel gear 40 and pinion 45 and facilitates functioning of the bayonet joint quick detachable means.

The operation of the power take-off will now be apparent. The equipment to be powered by crank 30 is provided with the attachable component of the power take-off and is quickly and easily connected after first removing closure cap 46 by the familiar twist and pull movement to disengage the bayonet joint. Pinion 45 is inserted into sleeve 42 while collar 43 is slipped over the latter, aligning L-shaped grooves 43a with pins 42c and completing the connection by the push and twist movement for bayonet joint locking. To aid meshing of the teeth of pinion 45 with those of bevel gear 40, shaft 44 may be rotated slightly. After meshing is accomplished, spring washer 44d provides a resilient fit as collar 43 is urged inwardly to the twist position.

The equipment served by the power take-off may be functional while operating bicycle 10 as a vehicle, as for example, to drive a battery operated motor-generator which when used as a motor can be powered by a battery carried by the bicycle with power input through shaft 44 and pinion 45 to bevel gear 40 and crank 30 as a power assist means useful in climbing upgrades and convertible to a generator receiving power from crank 30 to charge the battery on downgrades or level travel, or to power a generator for a lighting system for bicycle 10.

When supported in a stationary position by means (not shown) placing rear wheel 14 out of ground contact, bicycle 10 becomes a useful instrumentality for comfortably seating its operator on seat S with hands, if desired, placed in relaxed fashion on handlebars H and legs on pedals 34 to supply rotary power to various types of equipment, such as, electrical generators for camping and emergency use, water pumps, rotary tools and machinery and the like. Also, bicycle 10 may be suitably mounted on a water craft to supply leg power to a propulsion means for the craft.

To disconnect the attachable component of the power take-off, collar 43 is simply disengaged from sleeve 42 by the twist and pull movement so that pinion 45 and shaft 44 is free to be withdrawn from sleeve 42. Closure cap 46 may then be replaced on the latter.

Within the scope of the invention, nylon or brass bushings may be substituted for bearings 44a and 44b, and sleeve 42 may be combined with collar 43 to provide a closed unit which can be threaded into opening 21a and shaped with flat faces for engagement by and tightening with a wrench, a suitable closure cap being used in place of cap 46 to be threaded into opening 21a.

The power take-off from the bicycle crank herein disclosed is seen to achieve the several objects of the invention and to be well adapted to meet conditions of practical use. As various possible embodiments might be made in the invention, and as various changes might be made in the disclosed constructions, it is to be understood that all matter herein set forth and shown in the accompanying drawing are to be interpreted as illustrative and not in a limiting sense.

What is claimed is:

1. A pedal bicycle with power take-off comprising a frame including a down tube, a seat supporting tube and a rear fork, all attached to and radiating from a journal box tubular casing, a pedal crank having a center section between a pair of radially extending arms, said center section extending through said casing and being rotatably supported by a pair of bearing means mounted in opposite ends of the casing, a drive sprocket for a bicycle chain mounted to turn with said center section and located beyond one of said casing opposite ends; power take-off means from said crank center section comprising a gear within said journal box casing mounted on and rotating with said crank center section between said bearing means, said casing being formed with an opening located for access to said gear, a third bearing means secured to said casing in said opening and rotatably mounting a drive shaft having its axis of rotation radially to said casing, and a pinion terminating said drive shaft meshing with said gear.

2. The journal box defined in claim 1 in which said power take-off means is formed with a permanent and a removable component, said permanent component including said gear, and said removable component including said third bearing means, drive shaft and pinion.

3. The journal box defined in claim 2 in which said removable component is connected to said permanent component by a quick detachable means.

4. The journal box defined in claim 3 in which said quick detachable means includes a sleeve mounted on said casing concentric with said opening and a collar concentric with said shaft, said third bearing means fitting into said sleeve and being retained therein by said collar fitting over and releasably locked onto said sleeve.

* * * * *